US011482846B2

United States Patent
Agnaou et al.

(10) Patent No.: US 11,482,846 B2
(45) Date of Patent: Oct. 25, 2022

(54) DEVICE COMPRISING AN ELECTRICAL CONDUCTOR AND A HOUSING

(71) Applicant: Schneider Electric Industries SAS, Rueil Malmaison (FR)

(72) Inventors: Abderrahmane Agnaou, Grenoble (FR); Sabine Wiebel, Saint Egreve (FR); Louis Linares, La Terrasse (FR); Pascal Lepretre, Porte de Savoie (FR); Jean-Michel Carrante, Champagnier (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 275 days.

(21) Appl. No.: 16/843,954

(22) Filed: Apr. 9, 2020

(65) Prior Publication Data

US 2020/0358278 A1 Nov. 12, 2020

(30) Foreign Application Priority Data

May 7, 2019 (FR) ...................................... 1904768

(51) Int. Cl.
*H02G 3/08* (2006.01)
*H02G 5/10* (2006.01)
(Continued)

(52) U.S. Cl.
CPC ............... *H02G 5/10* (2013.01); *H02B 1/305* (2013.01); *H02B 1/56* (2013.01)

(58) Field of Classification Search
CPC ............ H02G 5/10; H02G 5/025; H02G 5/00; H02G 3/08; H02G 3/081; H02G 3/16;
(Continued)

(56) References Cited

U.S. PATENT DOCUMENTS 3,621,109 A * 11/1971 Nakata .................... H02G 5/066
174/99 R
5,225,965 A * 7/1993 Bailey .................. H01L 23/4093
174/16.3
(Continued)

FOREIGN PATENT DOCUMENTS

CN          1083966 A      3/1994
CN        207234345 U      4/2018
(Continued)

OTHER PUBLICATIONS

English Language Machine Translation of Chinese Patent Application Publication No. CN1083966A, published on Mar. 16, 1994, 5 pages.

(Continued)

*Primary Examiner* — Angel R Estrada
(74) *Attorney, Agent, or Firm* — Locke Lord LLP

(57) ABSTRACT

Device including a housing, at least one electrical conductor and at least one support, the electrical conductor being configured to carry an electric current, the housing defining a chamber accommodating the electrical conductor, the support being configured to attach the electrical conductor to the housing, the housing being in particular made of a metal. The support is made of a ceramic, the support making contact both with the electrical conductor and with the housing.

18 Claims, 4 Drawing Sheets

(51) Int. Cl.
  *H02B 1/30* (2006.01)
  *H02B 1/56* (2006.01)

(58) Field of Classification Search
  CPC .......... H02G 15/10; H02B 1/305; H02B 1/56; H02B 1/565; H02B 1/015; H02B 1/202; H05K 7/20445; H05K 7/2049; H01H 9/52; H01H 1/62; H01B 17/16; H01B 17/18; H01B 17/14
  USPC ................ 174/500, 50, 520, 68.1, 17 R, 59; 220/3.2, 3.3, 4.02; 361/600, 601, 641, 361/648, 679.02
  See application file for complete search history.

(56) References Cited

U.S. PATENT DOCUMENTS

| | | | |
|---|---|---|---|
| 7,817,426 B2 | 10/2010 | Tamori | |
| 8,124,874 B2 * | 2/2012 | Blatter | H02G 5/068 439/604 |
| 8,552,297 B2 * | 10/2013 | Sologuren-Sanchez | H02G 5/068 174/138 R |
| 8,885,343 B2 * | 11/2014 | Lischeck | H05K 7/20454 361/720 |
| 9,577,416 B2 * | 2/2017 | Nisslbeck | H01B 1/02 |
| 2019/0139682 A1 | 5/2019 | Kern et al. | |

FOREIGN PATENT DOCUMENTS

| | | |
|---|---|---|
| DE | 102016209134 | 11/2017 |
| JP | S6055209 U | 4/1985 |

OTHER PUBLICATIONS

English Language Machine Translation of Chinese Patent Application Publication No. CN207234345U, published on Apr. 13, 2018, 7 pages.

English Language Machine Translation of Japanese Patent Application Publication No. JPS6055209U, published on Apr. 18, 1985, 3 pages.

Search Report for French Patent Application No. FR1904768 dated Jan. 13, 2020, 2 pages.

Written Opinion for French Patent Application No. FR1904768 dated Jan. 13, 2020, 5 pages.

* cited by examiner

DEVICE COMPRISING AN ELECTRICAL CONDUCTOR AND A HOUSING

TECHNICAL FIELD

The present invention relates to a device comprising a housing and at least one electrical conductor.

BACKGROUND

Numerous devices comprise one or more electrical conductors contained in a housing defining a chamber, these one or more electrical conductors connecting electrical members contained in the chamber to one another. These electrical members are, for example, outgoing electrical lines, circuit breakers, electrical connectors connected to an external electrical network, or switching members or computer modules.

In many cases, the conductors and/or the electrical members are attached to the lateral walls of the housing, which then hold them in position without additional framework being required. By example, the electrical conductors that connect the outgoing lines in an electrical enclosure to the incoming line (which receives electric current from an external electrical network) are attached to an inner face of the housing.

Of course, the operation of these electrical members and the flow of electric current through the one or more conductors generate heat, which may reach many tens of degrees or more. However, the materials from which the conductors and the various electrical members are made risk being damaged if the heating gets too high. For example, copper conductors may be damaged by temperatures higher than about 140° C.

To prevent such heating, it is known practice in particular to size electrical conductors according to the current that they are to carry, since the heating of an electrical conductor is dependent on current density. Thus, if the sectional area of the conductor is large enough, the heating of the conductor remains limited. Conversely, a conductor provided for a given current intensity cannot be used to carry a larger current or, at constant current intensity, the sectional area of the electrical conductor cannot be decreased below a given threshold without heating becoming excessive. This means that the weight of the conductors cannot be decreased below a certain limit, and that the housing must therefore be sized to bear them. Thus, a number of constraints are involved in the sizing of the device.

SUMMARY

There is therefore a need for a device including a housing and at least one electrical conductor that allows greater freedom in the sizing of this conductor.

To this end, what is proposed is a device including a housing, at least one electrical conductor and at least one support, the electrical conductor being configured to carry an electric current, the housing defining a chamber accommodating the electrical conductor, the support being configured to attach the electrical conductor to the housing, the housing being in particular made of a metal, the support being made of a ceramic, the support making contact both with the electrical conductor and with the housing.

According to particular embodiments, the device includes one or more of the following features, alone or in any technically feasible combination:

the housing comprises a set of lateral walls defining the chamber in a horizontal plane, the support being configured to suspend the conductor on a lateral wall;

at least one of the following properties is exhibited:

the housing is made of a metal, in particular of steel;

the conductor is a metal bar;

the ceramic is alumina;

the support includes a first portion that bears against an inner face of the housing and a second portion, the first portion being interposed between the electrical conductor and the housing in a first direction, the second portion extending from the first portion in the first direction, the electrical conductor bearing against the second portion, the first direction being in particular a direction perpendicular to the inner face of the housing;

the second portion has a first face and a second face, opposite the first face, the electrical conductor bearing against the first face, the device further including, for each support, at least one first clip, in particular made of metal, that is configured to come to bear against the second face so as to press the electrical conductor against the first face;

the lateral wall on which the conductor is suspended is delimited in the first direction by the inner face and by an outer face, the device further including, for each support, at least one second clip that is configured to come to bear against the outer face and against the first portion so as to press the first portion against the inner face, the second clip being in particular identical to the first clip;

the support further includes a third portion that extends from the first portion in the first direction, the electrical conductor being intercalated between the second portion and the third portion in a second direction perpendicular to the first direction;

the device includes at least two supports for each electrical conductor; and the device is an electrical distribution enclosure including a plurality of outgoing electrical lines and one incoming line, the incoming line being suitable for receiving an electric current, in particular at low voltage, from an electrical network to which the incoming line can be connected, each outgoing electrical line being configured to be electrically connected to an electrical installation that the outgoing electrical line is capable of supplying with electricity, each electrical conductor being configured to electrically connect one respective outgoing electrical line to the incoming line.

BRIEF DESCRIPTION OF THE DRAWINGS

Features and advantages of the invention will become apparent upon reading the following description which is provided solely by way of nonlimiting example and with reference to the appended drawings, in which.

DETAILED DESCRIPTION

Figure 1:
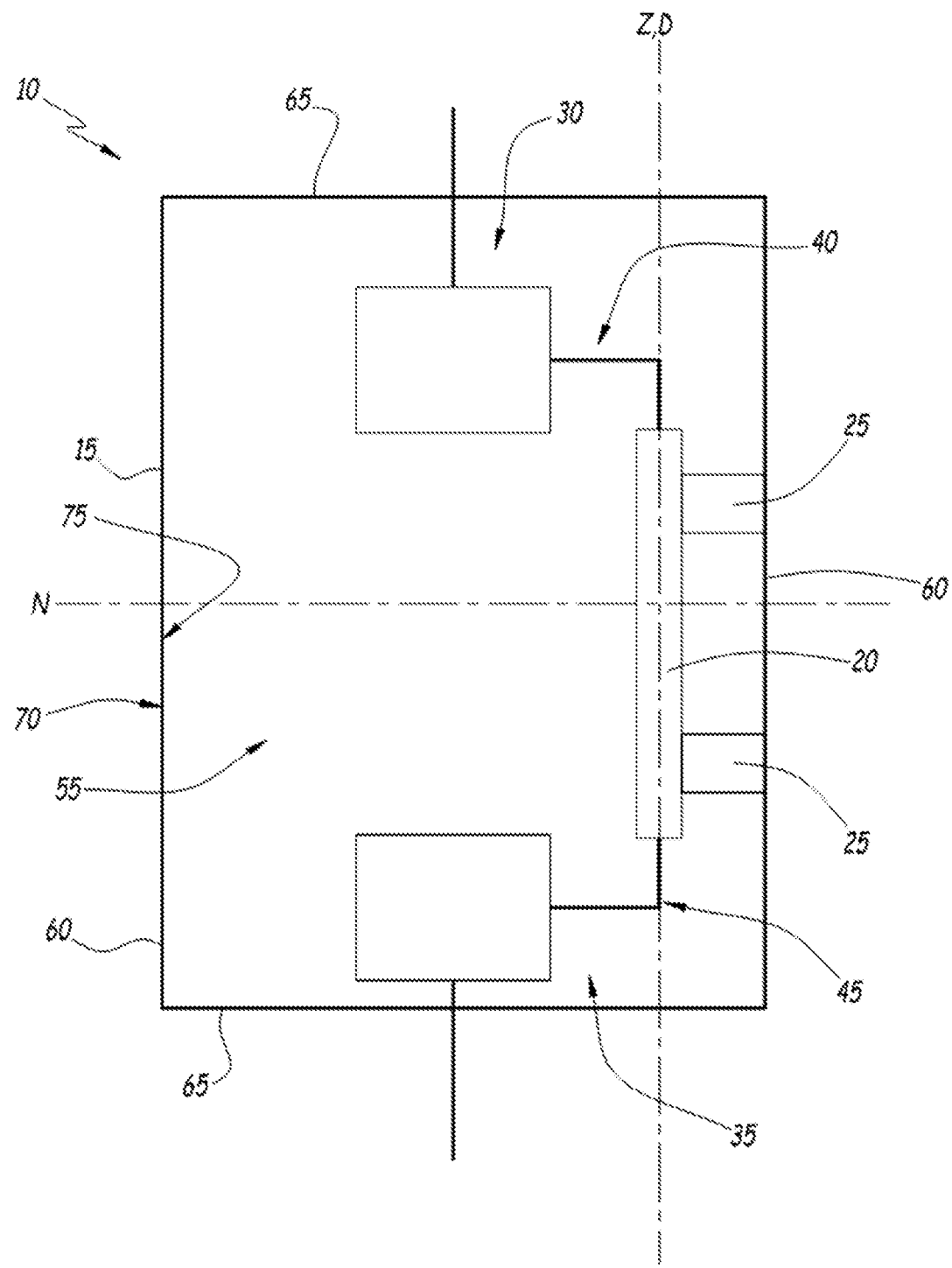
FIG. 1 schematically shows a device according to the invention including at least one electrical conductor and support.

An electrical device 10 is shown in FIG. 1.

The electrical device 10 includes a housing 15, at least one electrical conductor 20 and, for each electrical conductor 20, at least one support 25.

The device 10 is, for example, an electrical enclosure comprising one incoming line 30 and a set of outgoing electrical lines 35, only one of which is shown in FIG. 1 for the sake of improved clarity. In this case, the incoming line 30 is configured to be electrically connected to an electricity supply network, for example a low voltage network, i.e. a network at a voltage of between 50 V (volts) and 1000 V for a DC voltage or between 120 V and 1500 V for an AC voltage. Each outgoing electrical line 35 is provided for supplying a respective electrical installation with an electric current received from the incoming line 30.

Each outgoing electrical line 35 is electrically connected to the incoming line 30 by at least one electrical conductor 20.

For example, the incoming line 30 includes a plurality of electrical input connectors 40, corresponding for example to the various phases of the network, and each outgoing line includes a plurality of electrical output connectors 45, each electrical input connector 40 being electrically connected to an electrical output connector 45 of each outgoing line 35 by a corresponding electrical conductor 20. The electrical input 40 and output 45 connectors and the electrical conductors 20 then form an electricity distribution switchboard.

As an optional addition, each outgoing electrical line 35 and/or the incoming line 30 includes at least one circuit breaker 50 suitable for interrupting the current flowing through the outgoing electrical line 35 or the incoming line 30.

As a variant, the device 10 is an electrical distribution enclosure, a machine control enclosure or any other enclosure for protecting one or more electrical units.

The housing 15 defines a chamber 55. The chamber 55 accommodates each electrical conductor 20. For example, the chamber 55 accommodates each electrical conductor 20, each electrical input 40 or output 45 connector and each circuit breaker 50.

The housing 15 is, for example, made of a metal such as steel. In particular, the housing 15 is made of sheet steel.

However, it should be noted that other materials are also conceivable, for example other metals, or composite materials or plastics.

The housing 15 includes, for example, a set of planar walls. In particular, the housing 15 is a parallelepipedal housing having six walls, for example four lateral walls 60 and two end walls 65.

The lateral walls 60 define the chamber 55 in a horizontal plane when the device 10 is in operation. The lateral walls 60 delimit the chamber 55 in a vertical direction Z when the device 10 is in operation.

A set of inner faces 70 and a set of outer faces 75 are defined for the housing 15. Each lateral wall 60 is in particular defined by an inner face 70 and an outer face 75 of the corresponding lateral wall 60.

A normal direction N is defined for each lateral wall 60. The normal direction N is perpendicular to the inner face 70 of the lateral wall 60.

Each lateral wall 60 includes at least one opening 77 that passes through the lateral wall 60 between the outer face 75 and the inner face 70 so as to allow the support to be attached to the lateral wall 60.

Figure 2:
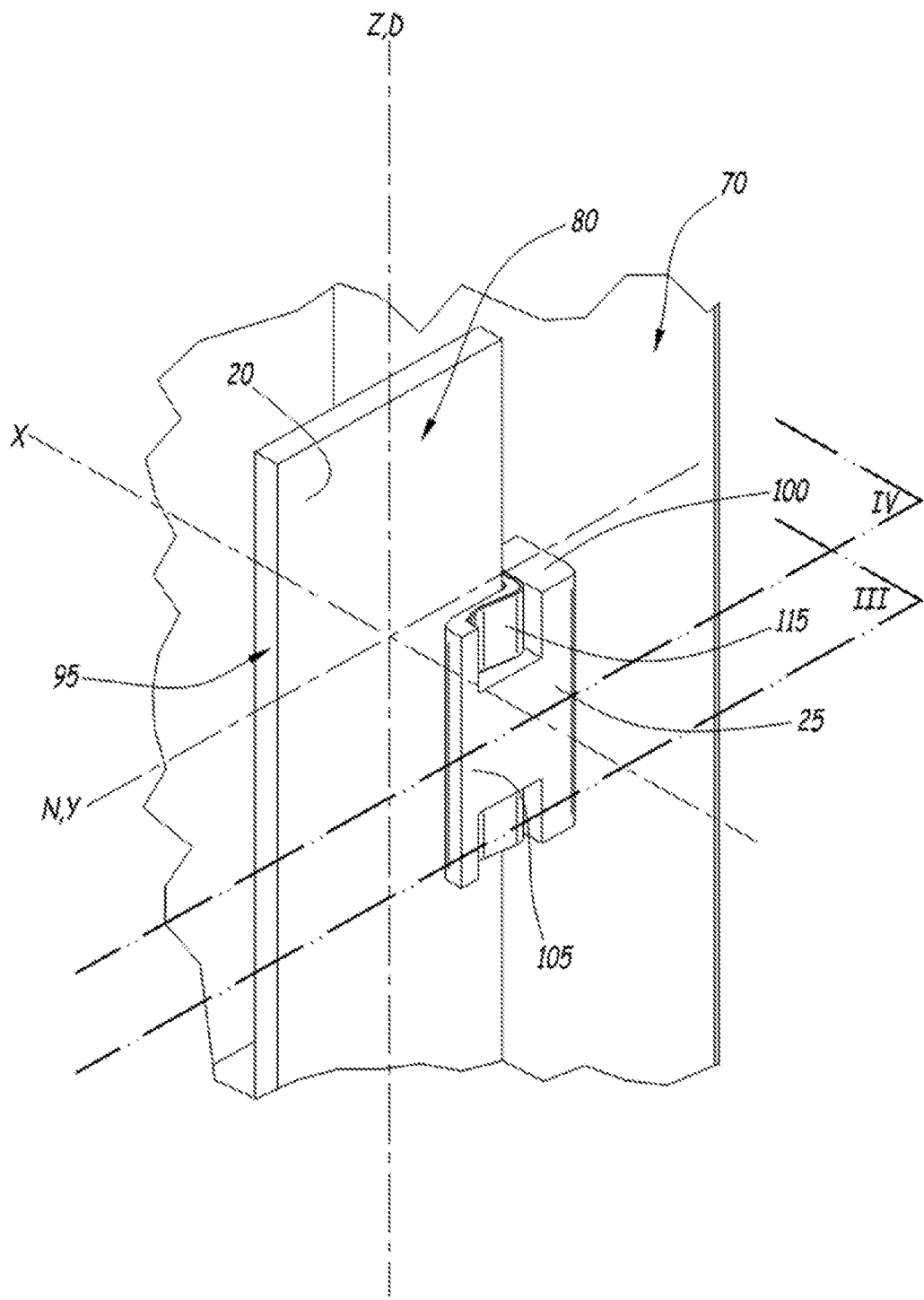
FIG. 2 is a perspective view of an example of an electrical conductor and support according to the invention.

Each electrical conductor 20 is, for example, a metal bar. For example, as shown in FIG. 2, the electrical conductor 20 is a parallelepipedal bar. In this case, the electrical conductor 20 runs in a main direction D, which is for example parallel to the vertical direction Z. However, the orientation of each electrical conductor 20 may vary.

As a variant, each electrical conductor 20 is a cable.

A sectional area for each electrical conductor 20 is defined. The sectional area is the area of a surface perpendicular to the direction in which an electric current flowing through the electrical conductor 20 propagates at any point in the section. For example, the sectional area is the area of a surface perpendicular to the main direction D.

The sectional area is between 250 mm$^2$ (square millimetres) and 1000 mm$^2$.

When the electrical conductor 20 is a parallelepipedal bar, the conductor 20 has, for example, a first lateral face 80 and a second lateral face 85 defining the electrical conductor 20 in a first direction X perpendicular to the main direction, and a third lateral face 90 and a fourth lateral face 95 defining the electrical conductor 20 in a second direction Y perpendicular to the main direction D and to the first direction X. The second direction Y is, for example, parallel to the normal direction N.

The thickness of the electrical conductor 20, measured in the first direction X, is for example between 5 mm (millimetres) and 10 mm.

The width of the electrical conductor 20, measured in the second direction Y, is for example between 50 mm and 100 mm. In particular, the width is strictly smaller than the thickness.

The sectional area is, in particular, equal to the product of the width and thickness.

The length of the electrical conductor 20, measured in the main direction D, is between 15 cm (centimetres) and 200 cm.

It should be noted that the dimensions of the electrical conductor 20 may vary.

Each electrical conductor 20 is made of an electrically conductive material such as a metal, in particular copper. As a variant, another material may be used.

Each electrical conductor 20 connects, for example, an electrical input connector 40 to an electrical output connector 45 when the device 10 is an electrical enclosure. However, according to some conceivable variants, at least one electrical conductor 20 is electrically connected to a switching member such as a circuit breaker, to a sensor, to a computer module, to another electrical conductor or to any other type of electrical member.

Each electrical conductor 20 is attached to the housing 15 by at least one support 25, for example by at least two supports 25. It should be noted that the number of supports 25 may vary, in particular according to the length of the electrical conductor 20.

Thus, each support 25 is configured to attach a corresponding electrical conductor 20 to the housing 15, for example together with one or more other supports 25 associated with the same electrical conductor 20.

The electrical conductor 20 is, in particular, attached to a lateral wall 60, in particular suspended on the lateral wall 60.

What is meant, in particular, by "suspended" is that the electrical conductor 20 is borne by the lateral wall 60, via the support 25, without the lateral wall 60 being located beneath the electrical conductor 20 when the device 10 is in operation. In particular, the electrical conductor 20 is not borne by the bottommost of the walls 65, nor by another member on which the electrical conductor 20 rests.

Figure 3:
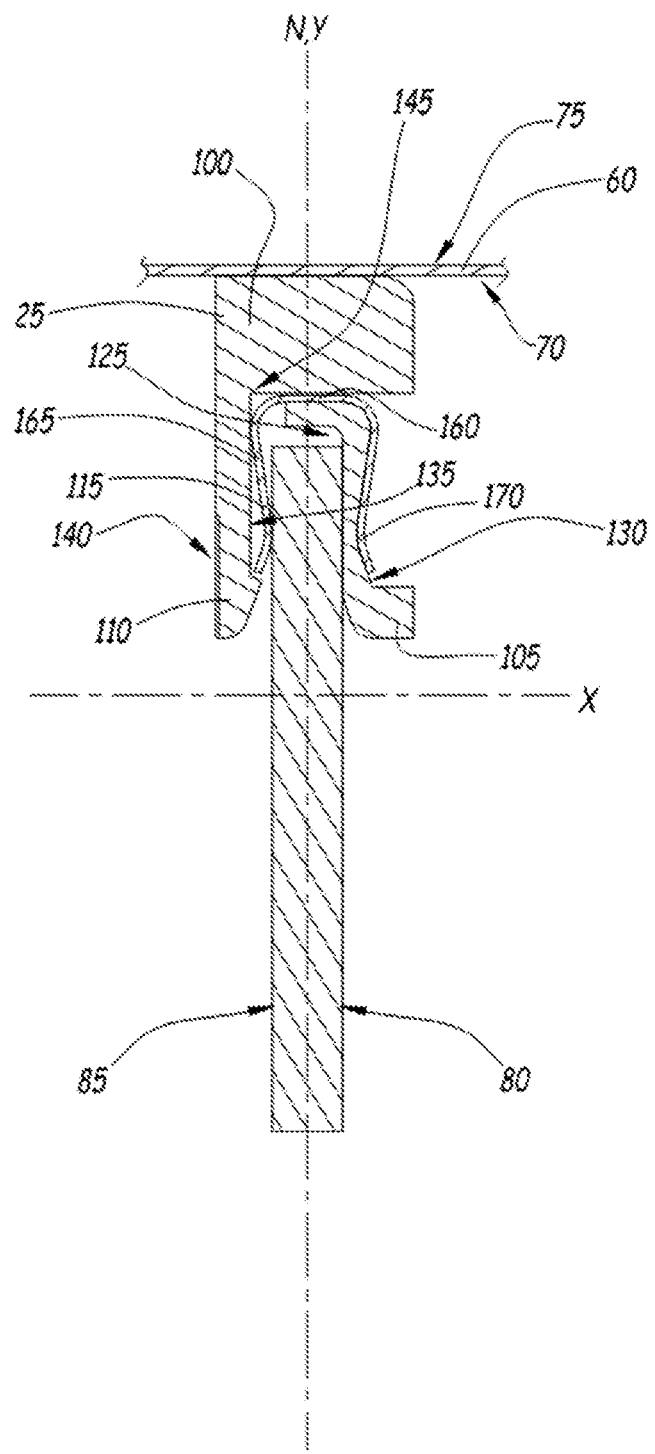
FIG. 3 is a sectional view of the electrical conductor and support of FIG. 2 through the plane III.
Figure 4:
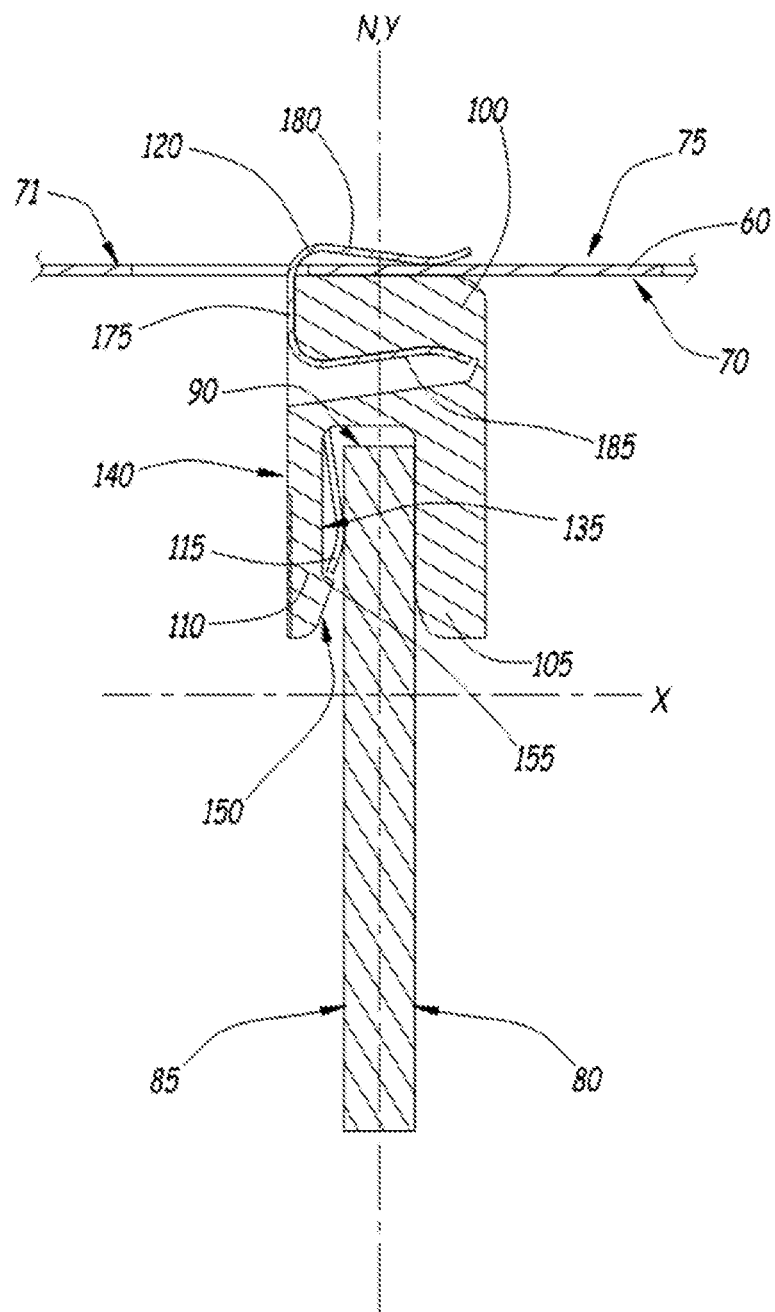
FIG. 4 is a sectional view of the electrical conductor and support of FIG. 2 through the plane IV.

The support 25 is shown in detail in FIG. 2, and appears in section through planes III-III and IV-IV, respectively, in FIGS. 3 and 4.

The support 25 makes contact both with the electrical conductor 20 and with the housing 15, in particular with the inner face 70 of the lateral wall 60 to which the electrical conductor 20 is attached. Thus, the support 25 is capable of conducting a heat flux from the conductor 20 to the housing 15. In particular, no electrically insulating material is interposed between the support 25 and the electrical conductor 20.

The support 25 is, in particular, at least partially interposed between the inner face 70 and the The support 25 is made of a material exhibiting a thermal conductivity that is higher than or equal to 10 $W \cdot m^{-1} \cdot K^{-1}$ (watts per metre per kelvin), in particular higher than or equal to 30 $W \cdot m^{-1} \cdot K^{-1}$, for example equal to 35 $W \cdot m^{-1} \cdot K^{-1}$.

Additionally, the support 25 is made of an electrically insulating material which exhibits, for example, an electrical resistivity that is higher than $10^{10}$ ohm-metres.

In particular, the support 25 is made of a ceramic. What is meant, in particular, by "ceramic" is an inorganic, non-metal material.

Alumina, or aluminium oxide, $Al_2O_3$, is one example of a ceramic.

Other examples of ceramics are for example aluminium nitride, AlN, silicon nitride $Si_3N_4$ and boron nitride BN.

The length of the support 25, measured in the main direction D, is between 10 cm and 30 cm.

According to the example shown in FIGS. 2 to 4, the support 25 includes a first portion 100, a second portion 105 and a third portion 110. Additionally, the device 10 includes, for each support 25, at least one first clip 115, in particular two first clips 115, and at least one second clip 120.

The first portion 100, the second portion 105 and the third portion 110 form, as will be seen below, a support 25 having a U-shaped cross section in a plane perpendicular to the main direction D.

The first portion 100, the second portion 105 and the third portion 110 are, for example, formed integrally with respect to one another. In other words, the support 25 is formed as a single piece.

The first portion 100 is interposed, in the normal direction N, between the inner face 70 and the electrical conductor 20, in particular the third lateral face 90. The first portion 100 is further interposed, in the normal direction N, between the inner face 70 and each of the second portion 105 and third portion 110.

The first portion 100 bears against the inner face 70, for example interposed between the inner face 70 and the electrical conductor 20.

The thickness of the first portion 100, measured in the first direction X, is between 20 mm and 100 mm.

The second portion 105 extends from the first portion 100 in the normal direction N.

The second portion 105 has a first face 125 and a second face 130. The first face 125 and the second face 130 define the second portion 105 in the first direction X.

The second portion 105 further has, for each first clip 115, an opening, in particular a slot, that passes through the second portion from the first face 125 to the second face 130.

The slot runs, in particular, in the main direction D from one end of the support 25.

The first face 125 faces the third portion 110. The first face 125 is, in particular, planar.

The electrical conductor 120 bears against the first face 125. For example, the first lateral face 80 bears against the first face 125.

In particular, as will be seen below, the electrical conductor 20 is pressed against the first face 125 by each first clip 115 corresponding to the support 25.

The third portion 110 extends from the first portion 100 in the normal direction N.

The third portion 110 has a third face 135 and a fourth face 140. The third face 135 and the fourth face 140 define the third portion 110 in the first direction X.

The third portion 110 further has at least one slot that passes through the third portion 110 from the third face 135 to the fourth face 140.

The third face 135 faces the second portion 110.

The third face 135 has an inner end 145 and an outer end 150 which delimit the third face 135 in the normal direction N. The inner end 145 makes contact with the first portion 100.

The outer end 150 has a protrusion 155. The protrusion 155 extends from the third face 135 in the direction X. In other words, the protrusion 155 extends in the direction of the second portion 105 in this direction X.

Each first clip 115 is made of a metal, for example of steel.

Each first clip 115 is configured to press the electrical conductor 20 against the second portion 105, in particular against the first face 125.

For example, each first clip 115 has a primary portion 160, a secondary portion 165 and a tertiary portion 170.

The primary portion 160 is at least partially accommodated within the slot in the second portion 105.

The primary portion 160 further bears against the first portion 100, which is in particular interposed between the primary portion 160 and the inner face 70. The primary portion 106 is, for example, interposed between the third lateral face 90 and the first portion 100.

Each of the secondary portion 165 and tertiary portion 170 extends in the normal direction N from the primary portion 160.

The electrical conductor 20 is interposed between the secondary portion 165 and the first face 125. In particular, the secondary portion 165 bears against the second lateral face 85.

Additionally, the secondary portion 165 is interposed between the protrusion 155 and the first portion 100. For example, one end of the secondary portion 165 is configured to come to bear against the protrusion 155 so as to prevent the secondary portion 165 from moving in the normal direction N, which would distance the secondary portion 165 from the first portion 100.

According to one conceivable embodiment, the secondary portion 165 takes a curved shape that moves away from the second lateral face 85 at the end of the secondary portion 165. For example, this end 165 bears against the third portion 110, in particular against the protrusion 155.

The second portion 105 is interposed between the tertiary portion 170 and the electrical conductor 20. In particular, the tertiary portion 170 bears against the third face 130.

The primary 160, secondary 165 and tertiary 170 portions cooperate so as to press the electrical conductor 20 against the second portion 105, for example through the elasticity of the material of which the first clip 115 is made.

The primary 160, secondary 165 and tertiary 170 portions are, for example, formed integrally with respect to one another.

Each second clip 120 is configured to attach the support 20 to the housing 15, in particular to the corresponding lateral wall 60. In particular, each second clip 120 is configured to come to bear against the outer face 75 and against the first portion 100 so as to press the support 25 against the inner face 70.

Each second clip 120 is, for example, structurally identical to the first clip 115.

The primary portion of the second clip 120 is referred to hereinafter as the intermediate portion 175.

The intermediate portion 175 is at least partially accommodated within the opening 77. In particular, the intermediate portion 175 bears against one of the faces delimiting the opening 77, in particular a lower face of the opening 77, such that the intermediate portion 175 transfers at least some of the weight of the support 25 and of the electrical conductor 20 to the lateral wall 60.

The secondary portion of the second clip 120 is referred to hereinafter as the outer portion 180. The outer portion 180 bears against the outer face 75.

The tertiary portion of the second clip 120 is referred to hereinafter as the inner portion 185. The inner portion 185 bears against the first portion 100, in particular against a face of an opening made in the first portion 100.

The outer portion 180, the intermediate portion 175 and the inner portion 185 cooperate so as to press the first portion 100 against the inner face 70, for example through the elasticity of the second clip 120.

It should be noted that, although the support 20 has been described above for the case in which the support cooperates with the first clips 115 in order to attach the conductor 20 to the housing, embodiments in which no first clip 115 is present are also conceivable. For example, the conductor 20 is force-fitted between the second and third portions 105 and 110, and the conductor 20 is then held in place by the force exerted on the conductor 20 by the portions 105 and 110. As a variant, the conductor 20 has a groove into which the protrusion 115 is fitted, one face of the protrusion bearing for example against the protrusion 155 so that the weight of the electrical conductor 20 is borne by the support 25.

According to another variant, no second clip 120 is used, for example if the first portion 100 is accommodated within a cavity or an opening in the housing 15.

It should also be noted that embodiments in which, in addition to the supports 20 made of ceramic, supports made of another material are also present are also conceivable.

Additionally, embodiments in which the shape of the supports 25 is different from the shape shown in FIGS. 2 to 4 are also conceivable.

The support 25, made of ceramic, allows the conductor 20 to be electrically insulated from the housing 15 while allowing heat transfer between the conductor 20 and the housing 15. Thus, the cooling of the conductor 20 is enhanced. For the same carried current intensity, the sectional area of the conductor 20 may be decreased; this means that less material is needed to manufacture the conductor 20 and hence the weight of the conductor 20 is decreased. As a result, the housing 15 may be thinner and the cost of the conductor 20 is lower.

For the same sectional area of conductor 20, the intensity of the current flowing through the conductor 20 may be increased.

Alumina is particularly suitable for use as the support 25 due to its good thermal conductivity and its electrically insulating character.

Metal bars are examples of electrical conductors 20 that are liable to carry large currents.

It is particularly useful to be able to decrease the sectional areas of conductors when they are suspended on the lateral walls 60 of the housing 15.

Supports 25 having a first portion 100 and a second portion 105 against which the conductor 20 bears allow the conductor 20 to be held in position effectively and good thermal contact between it and the support 25, in particular through bearing against the second portion 105. Thus, the cooling of the electrical conductor 20 is enhanced.

In this configuration, the one or more first clips 115 allow the conductor 20 to be attached to the support 25 in a straightforward manner. Additionally, when the one or more first clips 115 are made of a metal, the one or more first clips 115 also play a role in the heat transfer between the electrical conductor 20 and the support 25 and thus in the cooling of the electrical conductor 20.

Similarly, the use of the second clip 120 allows the support 25 to be attached to the lateral wall 60 in a straightforward manner, and further enhances heat transfer between the support 25 (and hence the conductor 20) and the housing 15, which contributes to cooling the electrical conductor 20. The assembly of the device 10 is simplified when the second clip 120 is identical to the first clips 115.

The third portion 110 allows the conductor 20 to be protected from impacts. Furthermore, the third portion 110 allows the first clips 115, and hence the electrical conductor 20, to be held in place better while allowing enhanced heat transfer when the third portion 110 is in contact with the conductor 20 or with the one or more first clips 115.

The invention claimed is:

1. A device comprising a housing, at least one electrical conductor and at least one support, the electrical conductor being configured to carry an electric current, the housing defining a chamber accommodating the electrical conductor, the support being configured to attach the electrical conductor to the housing, wherein the support is made of a ceramic, the support making contact both with the electrical conductor and with the housing, wherein the support includes a first portion that bears against an inner face of the housing and a second portion, the first portion being interposed between the electrical conductor and the housing in a first direction, the second portion extending from the first portion in the first direction, the electrical conductor bearing against the second portion, the first direction being a direction perpendicular to the inner face of the housing, wherein the electrical conductor extends in length in a second direction perpendicular to the first direction, and wherein the second portion is perpendicular to the first portion in a plane perpendicular to the second direction.

2. The device according to claim 1, wherein the housing comprises a set of lateral walls defining the chamber in a horizontal plane, the support being configured to suspend the conductor on a lateral wall.

3. The device according to claim 1, wherein at least one of the following properties is exhibited:
the housing is made of a metal;
the conductor is a metal bar.

4. The device according to claim 1, wherein the ceramic is alumina.

5. The device according to claim 1, wherein the second portion has a first face and a second face, opposite the first face, the electrical conductor bearing against the first face, the device further including, for each support, at least one first clip that is configured to come to bear against the second face so as to press the electrical conductor against the first face.

6. The device according to claim 5, wherein the housing comprises a set of lateral walls defining the chamber in a horizontal plane, the support being configured to suspend the conductor on a lateral wall, and wherein the lateral wall on which the conductor is suspended is delimited in the first direction by the inner face and by an outer face, the device further including, for each support, at least one second clip that is configured to come to bear against the outer face and against the first portion so as to press the first portion against the inner face.

7. The device according to claim 5, wherein the at least one first clip is made of metal.

8. The device according to claim 6, wherein the second clip is identical to the first clip.

9. The device according to claim 1, wherein the support further includes a third portion that extends from the first portion in the first direction, the electrical conductor being intercalated between the second portion and the third portion in a third direction perpendicular to the first direction.

10. The device according to claim 1, including at least two supports for each electrical conductor.

11. The device according to claim 1, the device being an electrical distribution enclosure including a plurality of outgoing electrical lines and one incoming line, the incoming line being suitable for receiving an electric current, from an electrical network to which the incoming line can be connected, each outgoing electrical line being configured to be electrically connected to an electrical installation that the outgoing electrical line is capable of supplying with electricity, each electrical conductor being configured to electrically connect one respective outgoing electrical line to the incoming line.

12. The device according to claim 11, wherein the electric current is at low voltage.

13. The device according to claim 1, wherein the housing is made of metal.

14. The device according to claim 13, wherein the housing is made of steel.

15. The device according to claim 1, wherein the support has a U-shaped cross section in the plane perpendicular to the second direction.

16. The device of claim 15, wherein the electrical conductor is intercalated between the U-shaped cross section in a third direction perpendicular to the first direction.

17. The device of claim 16, wherein the support further includes a third portion that extends from the first portion in the first direction, and wherein the first portion, the second portion and the third portion form the support having the U-shaped cross section.

18. A device comprising a housing, at least one electrical conductor and at least one support, the electrical conductor being configured to carry an electric current, the housing defining a chamber accommodating the electrical conductor, the support being configured to attach the electrical conductor to the housing, the housing being made of a metal, wherein the support is made of a ceramic, the support making contact both with the electrical conductor and with the housing, the device being an electrical distribution enclosure including a plurality of outgoing electrical lines and one incoming line, the incoming line being suitable for receiving an electric current, at low voltage, from an electrical network to which the incoming line can be connected, each outgoing electrical line being configured to be electrically connected to an electrical installation that the outgoing electrical line is capable of supplying with electricity, each electrical conductor being configured to electrically connect one respective outgoing electrical line to the incoming line.

* * * * *